Feb. 18, 1964 J. HAFSTAD ETAL 3,121,762
METHOD AND APPARATUS FOR PRODUCING REGENERATED CELLULOSE FILM
Filed July 17, 1961 2 Sheets-Sheet 1

INVENTORS
JAKOB HAFSTAD
KENNETH RALPH WILSON
BY Herbert M. Wolfson
ATTORNEY

Feb. 18, 1964  J. HAFSTAD ETAL  3,121,762
METHOD AND APPARATUS FOR PRODUCING REGENERATED CELLULOSE FILM
Filed July 17, 1961  2 Sheets-Sheet 2

INVENTORS
JAKOB HAFSTAD
KENNETH RALPH WILSON
BY Herbert M. Wolfson
ATTORNEY

3,121,762
METHOD AND APPARATUS FOR PRODUCING REGENERATED CELLULOSE FILM

Jakob Hafstad, Buffalo, and Kenneth Ralph Wilson, Tonawanda, N.Y., assignors to E. I. du Pont de Nemours and Company, Wilmington, Del., a corporation of Delaware
Filed July 17, 1961, Ser. No. 124,437
12 Claims. (Cl. 264—99)

This invention relates to the production of nonfibrous polymeric films, foils, sheets and pellicles. The invention is particularly concerned with the production of regenerated cellulose film having improved properties in both the transverse and longitudinal directions and being substantially uniform in thickness across its width and free of striations.

In the conventional system for producing regenerated cellulose films from viscose or other cellulosic solutions, such as cuprammonium cellulose, the film-forming solution is extruded into a coagulating and/or regenerating bath through a narrow slot. The film is drawn from this extrusion slot through a series of treating liquids by using suitably disposed guiding rolls, at least some of which are positively driven. Some rolls are disposed above baths of the treating liquids for transferring film from one bath to another, and some are disposed in the baths, the combination of rolls providing a sinuous path of travel for the film through the baths. The nature of the treating liquids depends upon the particular type of film-forming solution used. When viscose is the film-forming solution, the extruded film may pass from the coagulating and/or regenerating bath into an additional regenerating bath where regeneration is substantially completed and then to suitable washing, desulfuring, bleaching and softening baths of the conventional process.

Because of the force exerted upon the traveling film by the driving rollers, the film is tensioned in the machine or longitudinal direction. The force of the liquid baths as the film moves through each bath, the bath drag, also contributes to stretching the film. Depending upon the rate of the film through the baths, the number of rolls used, the length of travel through the baths, an amount of stretch that may vary from 5% to as high as 50%, based on the initial length of the film, may be inherently imparted to the film in the longitudinal direction. After passing through the liquid treatment baths, the film proceeds in a sinuous path about a series of drying rolls which may be heated internally or may be disposed in a closed chamber through which a heated fluid medium is circulated. At least some of these rolls are driven and the tension produced longitudinally in the film prevents any shrinkage in the longitudinal direction so that the stretch of 5%–50% is retained in the final regenerated cellulose film.

This conventional system for producing regenerated cellulose film provides several difficulties. In the drying of the regenerated cellulose film, it is noted that the edges of the flat sheet cannot be effectively restrained. Hence, the areas adjacent the edges become thicker than the rest of the sheet. The extremes of these thickened longitudinal edges on the film are commonly referred to as "beads." To overcome this, one may resort to an extrusion slot, the width of which is tapered down to a narrower width at each end of the slot to compensate for the subsequent edge thickening. However, the use of such a slot produces film edges that are weakened and tear easily during the coagulation step. When a tear starts from the edge of the film, it progresses almost instantly across the entire film, interrupting the operation of the machine. The alternative to this, using a uniform slot and then removing the beads in a slitting operation, is obviously uneconomical.

Another difficulty of the conventional process arises from the unidirectional stretch that is inherent in the process. Because of this inherent stretch of 5%–50% in the longitudinal direction, the important properties of the film, such as the strength, the shrinkage and the swelling of the film, tend to lack uniformity in all directions of the film. The result is a relatively poor film, particularly deficient in durability at temperatures below 5° C., and at humidities below 35% relative humidity. Frequently, this unidirectional stretch also results in longitudinal ridges or striations in the film.

The objects of the present invention are to overcome the difficulties of the conventional system for producing regenerated cellulose film without wasting any of the regenerated cellulose film. A particular object is to provide a regenerated cellulose film of improved strength, toughness, etc., which is substantially uniform in thickness across its width. A further object is to provide a regenerated cellulose film having substantially balanced properties in the longitudinal and transverse directions. Other objects include a continuous process and a novel apparatus for producing such regenerated cellulose film. Other objects will appear hereinafter.

The objects are accomplished in the process of extruding viscose in the form of a tubular film into a coagulating bath; advancing the tubular film through the bath to provide a gel tubular film; and expanding the tubular film, preferably 1½–3 times its extruded diameter, by extruding the tubular film in such a manner as to provide at least one longitudinal lane, preferably two longitudinal lanes in the tubular film, in which the wall thickness is less than the wall thickness of the remainder of the film, preferably so that each longitudinal lane represents approximately 10% of the circumference of the film; and then, after expanding the tubular film, slitting the tubular film along the center of each longitudinal lane to provide at least one flat film sheet which has relatively thin edge lanes; thereafter, regenerating the coagulated gel film as a flat sheet and then purifying, softening and drying the regenerated cellulose film.

It should be understood that although this invention is described for the preparation of cellophane or regenerated cellulose film from viscose solutions, i.e. from solutions of cellulose xanthate in dilute alkali, the invention is applicable to the preparation of regenerated cellulose films from solutions of other cellulosic intermediates such as alkaline solutions of cuprammonium cellulose, etc. Critical features of the process, however, are that the viscose is extruded to form a coagulated tubular film having the aforementioned non-uniform wall thickness and that the expansion of the tubular film is performed on a coagulated but substantially unregenerated cellulosic tubular film, i.e, on a tubular film that is composed substantially of the cellulose intermediate such as the cellulose xanthate or the like.

The non-uniform extrusion may be obtained by extruding the viscose through a circular die having restricting means in the feed channel of the die which can be adjusted at will to adjust or control the amount of viscose flowing to individual segments of the annular die. In the preferred embodiment, fixed restricting means in the feed channel are used and the annular lips of the die are rotated or oscillated independent of the restricting means in the feed channel. The viscose is extruded from the die into a bath to coagulate the viscose (preferably into a regenerating bath), the emerging tube is expanded immediately as it emerges from the die an amount equal to at least 1.5 times its machine direction and the transverse direction, respectively. The expanded tubing, having at least one longitudinal lane about 5%–20% thinner, preferably 5%–10% thinner than the thickness of the rest of the film, is then further expanded pneumatically between two pairs of nip rolls by an additional amount up to 50% of the circumference of the film. Preferably but not necessarily, expansion occurs while restraining belts are employed on opposite sides of the tubing, thus permitting the lane or lanes already thinned by the differential feeding of viscose to the segments of the die to be thinned an additional amount, (about 9–12% thinner at this stage). Instead of mechanical confinement by restraining belts, liquid or gas pressure may be applied in this expansion step around the area or areas whose ultimate thickness is to be greater than the remainder of the film or a negative pressure (by heating or applying a vacuum) may be superimposed around the area or areas whose ultimate thickness is to be smaller than the remainder of the film.

After the expansion step, the tubular viscose film may be regenerated to cellulose immediately and slit prior to drying or the film may be slit to form one or more flat sheets of film and then regenerated. In a continuous process, the sequence of steps is important. In the continuous process, it is preferred to slit the film along the center of the comparatively thin longitudinal lane immediately after the expansion step and prior to the regenerating step. In this way the film can be handled in conventional flat form through the conventional bath-containing tanks for regeneration, purification and softening and through the conventional driers.

As mentioned previously, regenerated cellulose film is stretched inherently from 5% to 50% in the longitudinal direction during the conventional manufacturing process. One purpose of the expansion in the present process is to counteract the inherent longitudinal stretch by providing a similar amount of transverse stretch. Since stretching the film in any direction tends to improve such properties as the strength, durability, etc., in the direction of stretch, one may stretch the film a desired amount deliberately. It is advantageous to impose such stretch on the coagulated, unregenerated film. Thus, both longitudinal stretching and transverse stretching can be carried out simultaneously during the expansion step. The pressure used for expansion would influence the amount of transverse stretching. The ratio of the rate at which the tubular film is withdrawn from the coagulating bath-to-the rate at which the film is extruded into the coagulating bath will influence the amount of imposed longitudinal stretch. It is preferred that the total amount of stretch in both directions be equal, each being between 1.5 and 3 times the dimensions of the film as extruded, to provide substantially balanced properties in both directions.

The invention will be more clearly understood by referring to the drawing and the accompanying description. In the drawing.

Figure 1:
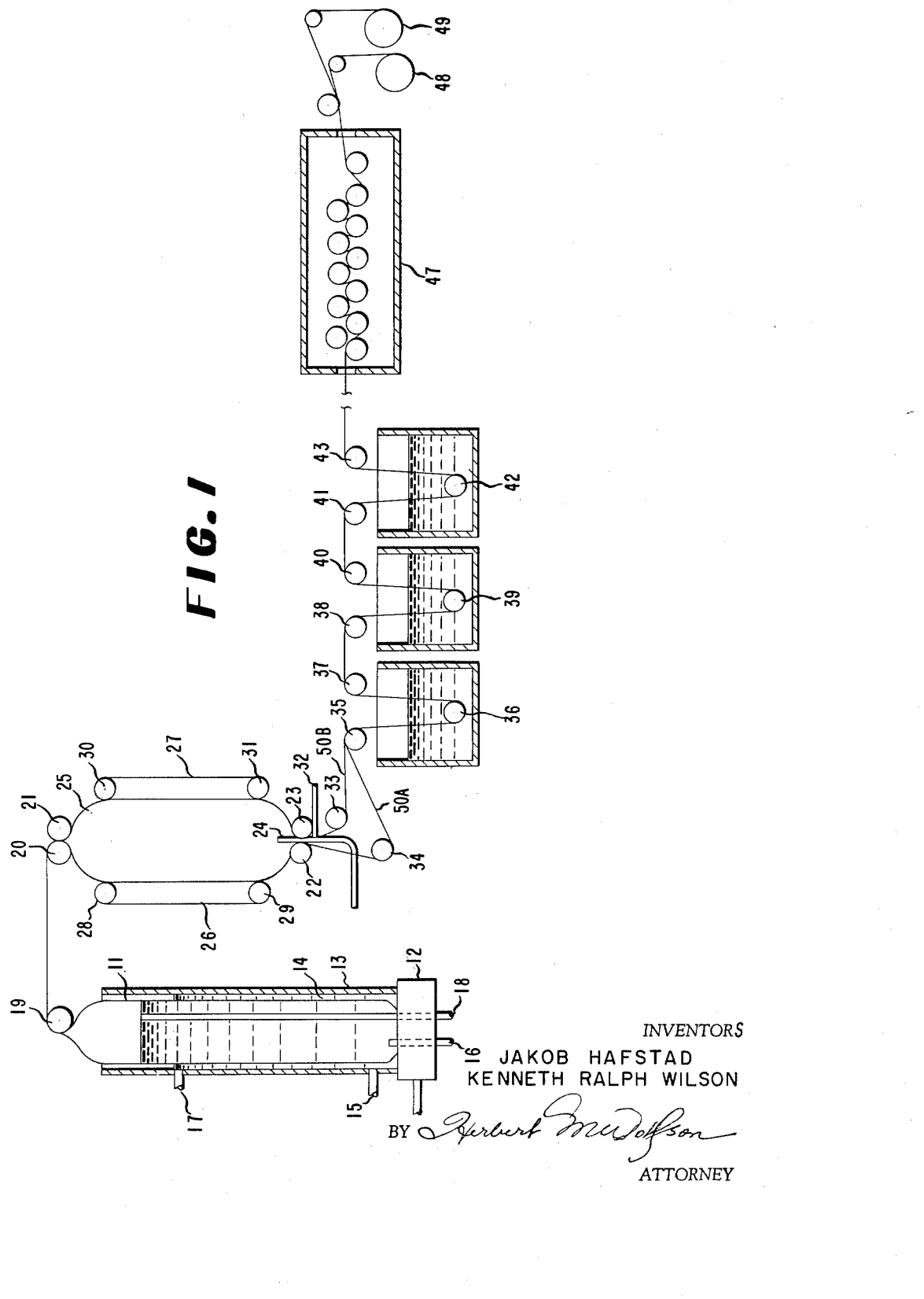
FIGURE 1 is a diagrammatic side elevation of the apparatus for carrying out the invention.
Figure 3:
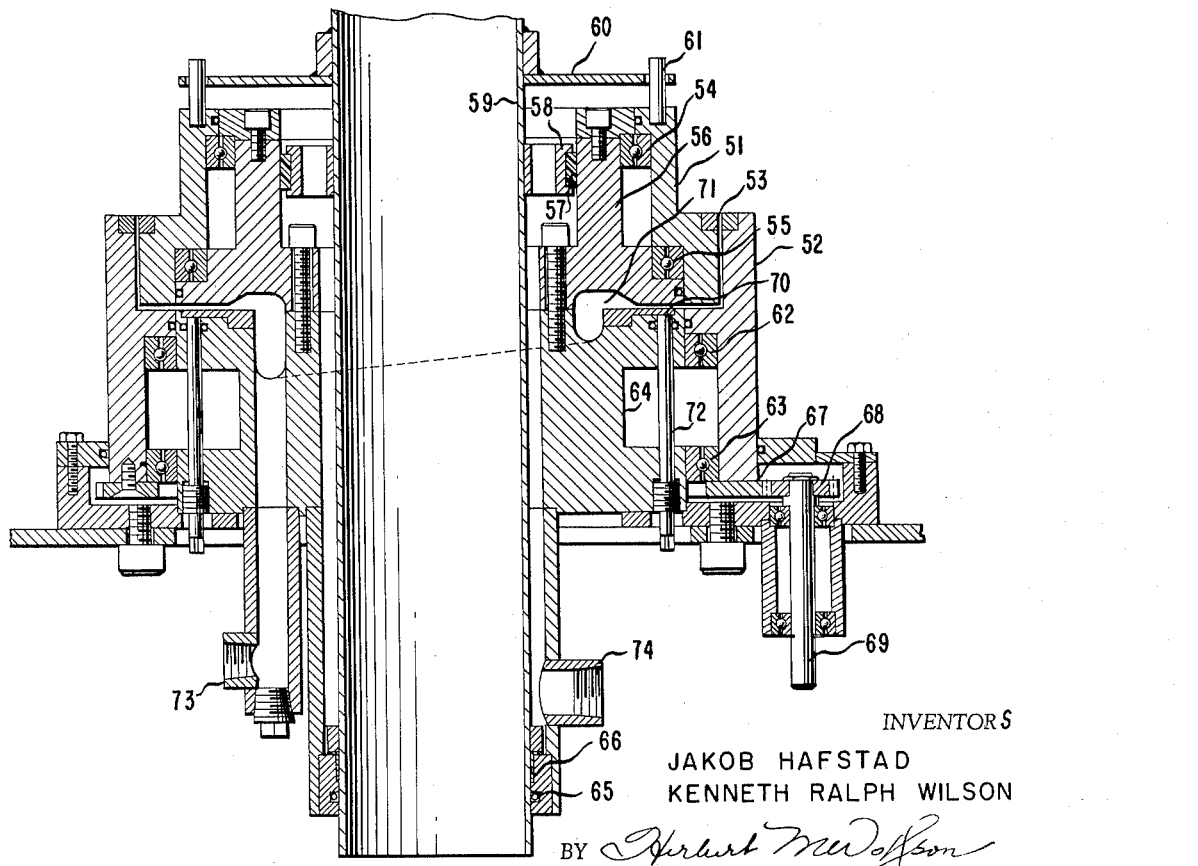
FIGURE 3 is a side elevation, in section, of another extrusion die for carrying out the invention.

Referring to FIGURES 1 and 3, viscose, preferably having a viscosity of at least 3000 poises and prepared in the conventional manner from caustic, carbon disulfide and cellulose, the latter preferably having an initial degree of polymerization of at least 500, is extruded through the circular die 12 having a lip opening of 10–60 mils into an enclosure or tank 13 containing coagulating liquid 14 to form a tubular film 11. The coagulating liquid, an aqueous solution containing 40%–50% ammonium sulfate and up to about 5% sulfuric acid, or a 10–24% sodium sulfate-5–15% sulfuric acid bath is maintained at a temperature of 30° C.–95° C. by means not shown. The coagulating liquid is fed into the tank through inlets 15 and 16 in FIGURE 1, as well as 64 in FIGURE 3. The liquid coming in through 15 serves to coagulate the outside surface of the film, and the liquid entering at 16 or 64 serves to coagulate the inner surface of the film. Outlets 17 and 18 in FIGURE 1 serve to maintain the desired level of coagulating liquid around and within the tubular film. In FIGURE 3, the hollow interior of shaft 59 serves as an outlet.

The circular die 12 is composed essentially of an inner die lip 51 and an outer die lip 52, the annular space between the lips providing the extrusion opening 53. Inner die lip 51 is mounted through bearings 54 and 55 on the upper die body 56, which in turn is mounted through roller bearing 57 on the mandrel support 58. The mandrel support 58 is spot-welded to the hollow cylindrical drive shaft 59. The shaft 59 is rotated by a motor and pulley arrangement, not shown. Also welded to the shaft 59 is the drive plate 60. A drive lug 61 connects the drive plate 60 to the inner die lip 51 for rotation therewith.

The outer die lip is also rotatably mounted around the shaft 59 but is not driven by this shaft. Specifically, lip 52 is mounted through bearings 62 and 63 on the lower die body 64, which in turn is mounted through bearing 65 on the mandrel support 66. The support 66 is welded to shaft 59. To drive the outer die lip 52, a driven gear 67 is bolted to the base of the die lip 52. Driving gear 68 mounted on the drive shaft 69 serves to drive gear 67 and thus to rotate the outer die lip 52.

To provide longitudinal lanes of limited thickness in the tubular viscose film issuing from between die lips 51 and 52, at least one throttling plate 70 is disposed in the viscose supply channel 71 in the area upstream of the opening 53 formed by the die lips 51 and 52. An adjustment bolt 72 is provided to control the throttling or restricting effect of plate 70. The viscose is supplied to the channel 71 through the entry port 73. Coagulating bath for coagulating the inside surface of the extruded tubular film is supplied through the feed port 74. The hollow interior of shaft 59 serves as the return channel for spent coagulating bath.

Figure 2:
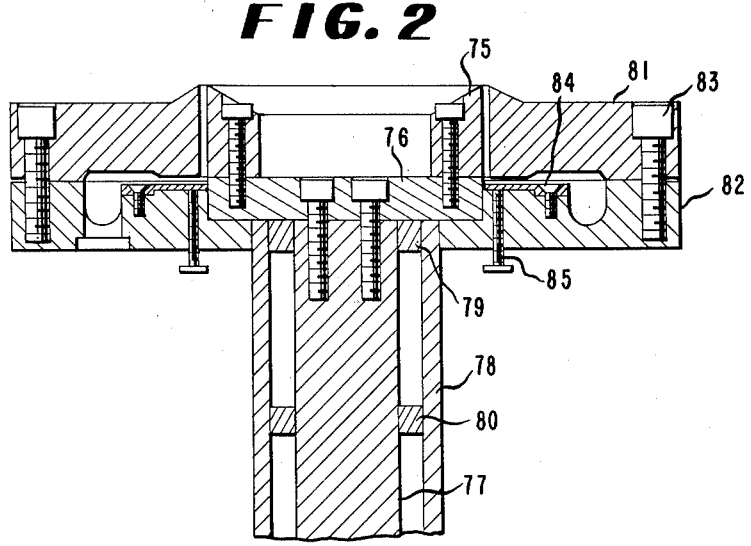
FIGURE 2 is a side elevation in section, of one extrusion die for carrying out the invention.

FIGURE 2 illustrates an extrusion die wherein only the inner die lip 75 is rotatable. It will be noted that the die lip 75 is bolted to plate 76 which in turn is bolted to the drive shaft 77. The tubular shell 78 mounted on roller bearings 79 and 80 is integrally connected to the outer die lip 81 through the support member 82 and bolt 83. The channel restricting or throttling plate 84 with its accompanying adjustment bolt 85 serve to provide the desirable thin lane in the extruded tubular film.

The rotation of one die lip in FIGURE 2 or FIGURE 3 or both die lips in FIGURE 3 provides a substantially uniform tubular film except for the thin lanes purposely provided by the restriction in the viscose feed channel. To achieve this uniformity, rotation should be imposed on the die lip or die lips at a minimum at about one revolution per hour to a maximum of about 60 revolutions per hour or higher. It will be obvious to one skilled in the art that the apparatus shown in FIGURES 2 and 3 may provide cylindrical extrusion, as illustrated, or they may be adapted to provide radial extrusion of tubular film.

After being extruded, the coagulated tubular gel film is then passed over guide roll 19 through the nip of rolls 20 and 21 and then through the nip of positively driven rolls 22 and 23. Between the two sets of nip rolls, the tubular film is expanded to stretch the film in the lateral or transverse direction. A tube 24 admitted through a circumferential groove in the surface of roll 23 conveys air or another gaseous medium for expanding the tubular film.

Added means may be provided to assure, and perhaps to augment, the formation of the lane 25 having a wall thickness that is less than the wall thickness of the remainder of the tubular film. This may take the form of moving belts 26 and 27, which resist expansion of the tubular film 11 by contacting the circumference of the tubular film except for the longitudinal lane 25 and a corresponding lane facing lane 25 on the underside of the tubular film, not shown. The endless belts would preferably be moved at the same rate as the advancing tubular film by the driven rotating rolls 28, 29, 30 and 31.

After the expanded film is collapsed through nip rolls 22 and 23, the film is slit by a knife 32 along the center of the reduced thickness lanes. The resulting two flat sheets of gel film 50A and 50B are then led as superimposed sheets by rolls 33—43 through a sulfuric acid-metal sulfate regenerating bath 44, the purification bath 45 and the softening bath 46. After softening, the film sheets are led to the drying chamber 47. The dried sheets are separated and wound on rolls 48 and 49.

It should be understood that the tubular gel film may also be expanded between the die and nip rolls by means of air passing into the interior of the film through a suitable opening in the die. After passing through driven nip rolls, the tubular film may then be slit by the knife and the resulting two film sheets may be processed as in FIGURE 1. In this embodiment, the optional restraining belts may be disposed in the coagulating bath tank.

The invention will be more clearly understood by referring to the examples which follow. Example 1 represents the best mode contemplated for carrying out the invention.

EXAMPLE 1

Alkali cellulose was prepared from sheets of paper-grade wood pulp, in which the cellulose had a degree of polymerization of 1000, by steeping the sheets in an aqueout solution containing 18.5% caustic at 23° C. for 30 minutes. The resulting alkali cellulose was then pressed to a press-weight ratio of 2.8:1. The steeped sheets were shredded at about 30° C. in a conventional shredder for two hours. Immediately thereafter the unaged alkali cellulose was xanthated by reaction with 35% carbon disulfide based on the weight of the dry pulp. Xanthation was carried out in a conventional baratte maintained at a temperature of about 35° C. for two hours. Dilute caustic solution was then admitted to the xanthated alkali cellulose and the mixture was stirred in the same vessel at a temperature between 5 and 10° C. for a period of three hours. The resulting viscose, containing 11.2% cellulose, was then deaerated by introducing it into a blow case maintained under reduced pressure and filtered by passing through a coarse 120-mesh screen. The viscose having a salt index [1] of 1.3 was extruded through the lips of the circular die shown in FIGURE 2, the lip opening of the die being 30 mils and the inner lip being rotated at the rate of 4 revolutions per hour, into an aqueous bath containing 12% sulfuric acid and 18% sodium sulfate and maintained at a temperature of 35° C. The casting arrangement was that shown in FIGURE 1.

The annular restricting means in the viscose supply channel was adjusted so that the film after initial expansion in the machine and transverse directions had two thin lanes on opposite sides of the tube with a thickness of about 6% less than the average thickness of the rest of the tube. The level of the casting bath in the interior of the extruded tubing was maintained at 0.4 inch above the level of the casting bath on the exterior of the tubing. The resulting hydraulic pressure and the speed of the advancing rolls served to stretch the tubing immediately upon emergence from the casting die to an extent of 2.5× in both the machine and transverse directions.

The resulting tubing was then advanced between the two sets of nip rolls where it was expanded pneumatically by maintaining air at a pressure of 10 inches of water within the interior of the tubular film. Two moving belts on opposite sides of the tube, each of which was in contact with approximately 170° of the circumference of the non-thinned sections of the tube, were employed to restrict expansion of the tubing in contact with the belts and to permit additional thinning of the unrestricted lanes of the tubing. The resulting expanded tubular film (increased in circumference by 30% over the original expanded dimension) was then slit in the center of each of the two thin lanes. The two resulting flat sheets of which the edge lanes were about 10% thinner than the rest of the film were then advanced simultaneously through a regenerating bath containing 18% sodium sulfate and 3% sulfuric acid to insure complete regeneration. The regenerated cellulose film sheets were then purified and dried in the conventional manner.

A one-mil thick film, in which the cellulose had a degree of polymerization of 600 was obtained. It was of substantially uniform thickness across its width, displaying an average variation of ±0.00005 inch. Its structural characteristics and properties are presented in the following table:

*Table I*

STRUCTURAL CHARACTERISTICS AND PROPERTIES OF THE FILM OF EXAMPLE 1

| Example | Structural Characteristics | | | | Properties | | | | | |
|---|---|---|---|---|---|---|---|---|---|---|
| | Volume Swelling (percent) | Orientation Angle (degrees) | Degree of Polymerization | T.D. Swelling (percent) | Stress-Flex (strokes) | Initial Tensile Modulus (p.s.i.) | Tensile Strength (p.s.i.) | Elongation (percent) | Tear Strength (gms./mil.) | Pneumatic Impact Strength (kg.-cm.) |
| 1 | 103 | 37 | 600 | 9 | 36 | 922,000 | 21,600 | 24 | 15.0 | 3.5 |

In a control experiment wherein no attempt was made to provide thinner lanes in the gel film prior to slitting and drying, a flat film was obtained with edge lanes about 10% thicker than the average thickness of the rest of the film. A mill roll of wound fill had very hard bands at the edge regions and the center of the roll was soft.

The structural characteristics and properties were determined using the following procedures:

*Percent volume swelling* is determined by measuring the length, width and thickness of a given sample under dry and wet conditions. The sample is conditioned at 50% relative humidity and a first measurement is made after which the sample is immersed in water at room temperature (24° C.) for 20 minutes; the sample is removed from the water bath, excess water quickly removed and the dimensions of the sample again are measured.

*Percent transverse direction* (*T.D.*) *swelling* is determined by measuring the change in transverse dimension of the film sample conditioned at 50% relative humidity and after immersion in water at 24° C. for 20 minutes, as described above.

*Orientation angle* is determined by mounting the sample in an X-ray apparatus so that the beam passes parallel to the machine direction axis of the film and perpendicular to the plane of the transverse and thickness direction axes of the film. The sample is then rotated about the machine direction axis and in the plane of the transverse and thickness direction axes to produce an X-ray diffraction pattern, the peak intensity of which is measured goniometrically. The orientation angle is defined as the width of the peak at the half maximum diffracted intensity. The values shown herein are for the T.D. orientation angle.

*Degree of polymerization* (*D.P.*) is determined by measuring the viscosity of a cupriethylene diamine solu-

---

[1] Salt index is determined by adding the viscose dropwise into a vigorously agitated solution of sodium chloride. The strength of solution expressed as percent which will just precipitate cellulose from the viscose solution is taken as the salt index.

tion of the cellulose and as described in TAPPI test T–230 relating degree of polymerization (D.P.) to viscosity by the following relationship:

$$D.P. = \frac{\log n - 0.4472}{1.295 \times 10^{-3}}$$

where $n$ is the viscosity in centipoises of a 1% solution of cellulose in cupriethylene diamine.

*Stress-flex*, recently described by H. C. Horst and R. E. Martin, Modern Packaging, volume 37, No. 7, March 1961, page 123, is a measure of the flexibility and durability of the film. A sample of film 4" x 7" is placed between two rubber-faced clamps one inch apart. One clamp is stationary, the other slides back and forth by gravity on two rods flexing the film as the whole assembly rotates, until the film sample breaks. The stress-flex value indicates the number of strokes of the movable clamp until the film sample breaks. For the tests at 75° F. the samples are pre-conditioned at 75° F.; the sliding clamp has a weight of four pounds.

*Tensile strength, elongation and initial tensile modulus.*—These measurements are made at 23° C. and 50% relative humidity. They are determined by elongating the film sample (samples are cut with a Thwing-Albert cutter which cuts samples ¼" wide) in an Instron tensile tester at a rate of 100%/minute until the sample breaks. The force applied at the break in lbs./square inch (p.s.i.) is the tensile strength. The elongation is the percent increase in the length of the sample at breakage. Initial tensile modulus in p.s.i. is directly related to film thickness. It is obtained from the slope of the stress/strain curve drawn through the origin and tangent to the curve at an elongation of 1%; both tensile strength and initial tensile modulus are based upon the initial cross sectional area of the sample. Where single values are given, they are the same in both longitudinal and transverse directions.

*Tear strength* is determined as described by D. W. Flierl, Modern Packaging, 52, 129 (1951).

*Pneumatic impact strength* is the energy required to rupture a film. It is reported in kilograms-centimeter/mil of thickness of the film sample. Pneumatic impact strength is determined by measuring the velocity of a ball mechanically accelerated by air pressure, first in free flight and then in flight immediately after being impeded by rupturing the test film sample. In this test, the film sample is 1¾" x 1¾". The projectiles are steel balls ½" in diameter and weighing 8.3 grams. The free flight ball velocity is 40±2 meters/second. The velocities are measured by timing photoelectrically the passage of the steel balls between two light beams set a definite distance apart. The pneumatic impact strength is measured by the loss in kinetic energy of the ball due to the rupturing of the film sample. It is calculated from the following formula:

Constant X/square of velocity in free flight—square of velocity in impeded flight where the constant is directly proportional to the weight of the projectile and inversely proportional to the acceleration due to gravity. This test is carried out at 23° C. and 50% relative humidity and the test samples are conditioned for 24 hours at 23° C. and 50% relative humidity.

EXAMPLE 2

Following the procedure of Example 1, a viscose containing 11.2% cellulose was extruded at a salt index of 1.3 through the circular die of FIGURE 3 having a lip opening of the die of 30 mils. The inner lip was rotated at a rate of 10 revolutions per hour; the outer lip, 6 revolutions per hour. The annular restricting means in the viscose supply channel was adjusted so that the film, after initial expansion in the machine direction and transverse direction of 2.5 times the original dimensions, had a thin lane on opposite sides of the tube of approximately 10% of the circumference of the tube with a thickness of 6% (2.6 mils) less than the average thickness of the remainder of the tube (2.8 mils). The viscose was extruded through the die into an aqueous bath containing 50% ammonium sulfate and maintained at a temperature of 90° C. The level of the casting bath in the interior of the tubing was 0.4 inch above that of the exterior of the tubing.

The resulting tubing was advanced between two sets of nip rolls where it was further expanded pneumatically by maintaining air at a pressure of 10 inches of water within the interior of the tubular film as described in Example 1. The overall circumference of the tube was expanded by 30%. As the tubing passed between the two confining sets of nip rolls, a narrow band heater was positioned on opposite sides of the tubing and adjacent to the two previously thinned longitudinal lanes of the film and heat was applied to these lanes to bring the temperature of the film to approximately 80° C. for a contact time of approximately two seconds. The resulting tubing (average thickness 2.1 mils; thinned lanes 1.9 mils) was then slit in the center of each of the two thinned lanes. The two resulting flat sheets were then advanced simultaneously through a regenerating bath of 15% sodium sulfate and 3% sulfuric acid, to regenerate the film. Thereafter, the film was purified and dried in the conventional manner.

A one-mil thick film, in which the cellulose had a degree of polymerization of 600 was obtained. It was of substantially uniform thickness across its width, the average variation being less than ±0.00005 inch. Its structural characteristics and properties are presented in the following table:

*Table II*
STRUCTURAL CHARACTERISTICS AND PROPERTIES OF THE FILM OF EXAMPLE 2

| Example | Structural Characteristics | | | | Properties | | | | | |
|---------|---|---|---|---|---|---|---|---|---|---|
| | Volume Swelling (percent) | Orientation Angle (degrees) | Degree of Polymerization | T.D. Swelling (percent) | Stress-Flex (strokes) | Initial Tensile Modulus (p.s.i.) | Tensile Strength (p.s.i.) | Elongation (percent) | Tear Strength (gms./mil) | Pneumatic Impact Strength (kg.-cm.) |
| 2 | 92 | 40 | 600 | 9 | 40 | 908,000 | 21,200 | 32 | 16.3 | 4.9 |

Having fully disclosed the invention, what is claimed is:

1. A process which comprises the steps of extruding viscose in the form of a tubular film into a coagulating bath in a manner to provide at least one longitudinal lane in said film in which the wall thickness is less than the wall thickness of the remainder of the film; advancing said tubular film through said bath to provide a gel tubular film; expanding the tubular film; slitting the tubular film along the center of said longitudinal lane of relatively thin wall thickness to provide at least one flat sheet of film having relatively thin edge lanes; regenerating said film and, subsequent to regeneration, purifying, softening and drying said film.

2. A process as in claim 1 wherein the film is expanded to 1.5–3 times its extruded diameter.

3. A process as in claim 1 wherein the tubular film is expanded in the coagulating bath immediately after extrusion.

4. A process as in claim 1 wherein said tubular film is extruded to provide two longitudinal lanes in which the wall thickness is less than the wall thickness of the remainder of the film.

5. A process as in claim 1 wherein each of said longitudinal lanes comprises approximately 10% of the circumference of said tubular film.

6. A process as in claim 1 wherein said film is stretched in the direction of advancement simultaneously with the expansion step.

7. A process which comprises the steps of extruding viscose in the form of a tubular film into a coagulating bath in a manner to provide at least one longitudinal lane in said tubular film in which the wall thickness is less than the wall thickness of the remaining circumference of said film; advancing said tubular film through said bath to provide a gel tubular film; applying gas pressure within said tubular film to expand said tubular film and simultaneously imposing a pressure on the thicker portion of the outside surface of said tubular film.

8. A process as in claim 7 wherein the pressure on the thicker portion of the outside surface of the tubular film is imposed by mechanical means.

9. A process as in claim 7 wherein the thinner portion of the outside surface of said tubular film is heated during expansion.

10. A process as in claim 7 wherein the tubular film is expanded within a confining, moving endless belt that partially surrounds and contacts the tubular film and moves in the direction of advancement of the tubular film when contacting the film, the pressure within the film and the location of the belt arranged to allow the thinner portion of the film to expand more than the thicker portion.

11. In an apparatus comprising a circular extrusion die adapted to extrude viscose in the form of a tubular film, said extrusion die composed of an inner die lip and an outer die lip, said die lips defining a circular extrusion orifice; a channel adapted to supply viscose to said extrusion orifice; a tank adapted to contain a liquid coagulant for said tubular viscose film; means for drawing said tubular film through said coagulant; means for expanding said tubular film; means for slitting; means for regenerating viscose; and means for drawing said slit film through said regentrating means, the improvement wherein at least one throttling plate is disposed in said channel adapted to provide at least one continuous longitudinal lane in the tubular film wherein the thickness is less than the thickness of the remainder of the film; wherein at least the inner die lip is adapted to rotate; and wherein said means for slitting is adapted to slit said tubular film along the center of the relatively thin longitudinal lane.

12. Apparatus as in claim 11 wherein both die lips are adapted to rotate.

References Cited in the file of this patent

UNITED STATES PATENTS

| | | |
|---|---|---|
| 1,133,892 | Swartz | Mar 30, 1915 |
| 1,248,962 | Webber | Dec. 4, 1917 |
| 2,176,925 | Reichel et al. | Oct. 24, 1939 |
| 2,220,221 | Dalton | Nov. 5, 1940 |
| 2,337,927 | Reichel et al. | Dec. 28, 1943 |
| 3,020,588 | Ferguson et al. | Feb. 13, 1962 |